United States Patent Office 3,108,097
Patented Oct. 22, 1963

3,108,097
PROCESS FOR PREPARING DIHYDRO-
BENZOTHIADIAZINEDIOXIDES
Ivar Ugi, % Munich Medical Associates, 54 Trogerstrasse,
Munich 27, Germany
No Drawing. Filed Aug. 10, 1960, Ser. No. 48,554
Claims priority, application Germany Aug. 13, 1959
4 Claims. (Cl. 260—243)

This invention is concerned in particular with a process for the preparation of 3,4-dihydro-1,2,4-benzothiadiazine-1,1-dioxides.

Dihydro-benzothiadiazinedioxides, which find application as diuretics, are usually prepared by condensation of ortho-amino-aryl-sulfonamides with formaldehyde or hexamethylenetetramine. This process was described in the J. Org. Chem., vol. 16 (1951), page 815 ff. The yields produced by this process are relatively low.

According to the present invention a process for the manufacture of compounds of the general formula

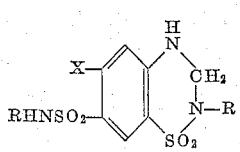

is described, wherein the R represents hydrogen atoms, alkyl- or aryl groups and the X represents a halogen or a group linked to the aromatic nucleus through a carbon, nitrogen, oxygen or sulfur atom, e.g. methyl, trifluoromethyl, cyano, dimethylamino-, methoxy, methanesulfonyl, or ethyl-mercapto groups. R preferably is hydrogen or one to five carbon atom alkyl or monocyclic aryl.

It has been now discovered that dihydro-benzothiadiazine dioxide derivatives of the above formula are easily prepared by reacting 1-amino-benzene-4,6-disulfonic acid dichlorides, substituted in the "3" position, initially in a basic medium, with a compound of the following formulae:

RNH—CH$_2$OR'
RN(CH$_2$—OR')$_2$
N(CH$_2$OR')$_3$ or

CH$_2$=N—R' wherein R is as mentioned above, and R' represents an alkyl or aryl group; the resulting intermediate is treated with an acid, preferably an organic acid such as glacial acetic acid or acid of similar ionic strength, and yields the desired product. It has been shown that with the process according to this invention a much higher yield is obtained, and that additionally the process involved is less complicated.

The process described can also be carried out by reacting the 1-amino-benzene-4,6-disulfonic acid dichlorides, substituted in the "3" position with a crude mixture of the mono-, di- and tri-alkoxymethylamines.

The condensation of the amino-aryl-disulfochloride with these compounds has, contrasted to the condensation of a sulfonamide with formaldehyde, the distinct advantage that one step of synthesis is eliminated, as follows:

The former synthesis predicated a step series as follows:

Amino-benzene disulfochloride→amino-benzene-
disulfonamide→dihydrobenzothiadiazine dioxide whereas the invention describes a process as follows:

Amino-benzene-disulfochloride→
dihydrobenzothiazinedioxide

Three examples of the process are as follows:

Example 1

10 grams of butoxymethylamine are dissolved in 50 ml. of aqueous tetrahydrofuran, and reacted with 10 grams of 1-amino-3-chloro-benzene-4,6-disulfonic acid dichloride under cooling. After two hours standing the reaction mixture is acidified with glacial acetic acid, allowed to stand for a further two hours and brought to boiling. After distilling off the solvents the residue is treated with water and 6 - chloro - 7 - sulfamyl-3,4-dihydro-1,2,4-benzothiadiazine-1,1-dioxide crystallizes.

Example 2

15 ml. of tetrahydrofuran are mixed with 15 ml. of a 10% ammonia solution. 2.7 grams of chloromethylamylether are added drop-wise to this mixture, under stirring, and the stirring continued ten minutes thereafter at room temperature. Aminomethylamylether is obtained. Under proper cooling 3.2 grams of meta-chloro-aniline-2,4-disulfonic acid dichloride is added portion-wise. Stirring is continued for four hours at room temperature. After standing 12 hours the mixture is acidified and brought to boiling. Under normal pressure the tetrahydrofuran is distilled off, and, thereafter, the water is removed by vacuum distillation.

The resulting residue is recrystallized in water. The melting point of the recrystallized product is approximately 269° C. The yield is 2.5 grams (approximately 78%) of 6-chloro-7-sulfamyl-3,4-dihydro-1,2,4-benzothiadiazine-1,1-dioxide.

Example 3

11.8 grams of n-propylamine are dissolved in 200 ml. of tetrahydrofuran and 13.6 grams of chloromethylamylether are added dropwise under cooling and stirring. The solution is agitated with saturated potassium carbonate solution, and the organic phase separated. To the resultant solution of the raw N-n-propyl-amino-methyl-amylether is added 31 grams of 1-amino-3-chloro-benzene-4,6-disulfochloride and 2.5 grams triethylamine.

After 12 hours standing 20 ml. of glacial acetic acid are added and, after two hours further standing, the mixture is heated for a short time in a reflux distillation. After cooling, the solvent is distilled off. After digestion with water the resultant 6-chloro-7-N-n-propylsulfonamido - 2 - propyl-3,4-dihydro-1,2,4-benzothiadiazine-1,1-dioxide is separated by filtration. The yield is 69% theoretical.

I claim:

1. A method for the preparation of 7-sulfamyl-3,4-dihydro-1,2,4-benzothiadiazine-1,1-dioxides, of the formula:

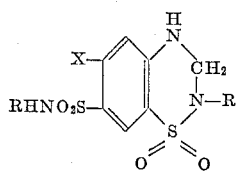

wherein R is a radical selected from the group consisting of hydrogen, lower alkyl and monocyclic aryl and X is a radical selected from the group consisting of halogen, alkyl, cyano, alkylamino, haloalkyl, alkoxy, alkylsulfonyl and alkyl-mercapto, which comprises reacting a compound of the formula:

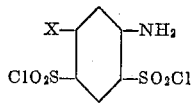

wherein X is radical as defined above with a compound selected from the group consisting of those having the following formulae:

RNH—CH$_2$OR'
RN(CH$_2$OR')$_2$
N(CH$_2$OR')$_3$ and

CH$_2$=N—R' wherein R represents a radical as defined above and R' represents a radical selected from the group consisting of lower alkyl and monocyclic aryl, thereafter treating the resulting intermediate with an acid selected from the group consisting of acetic acid and organic acids of similar ionic strength and recovering the resulting 7-sulfamyl-3,4-dihydro-1,2,4-benzothia-diazine-1,1-dioxides.

2. A method for the preparation of 7-sulfamyl-3,4-dihydro-1,2,4-benzothiadiazine-1,1-dioxides, of the formula:

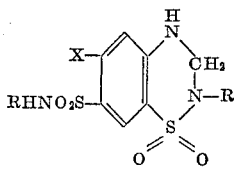

wherein R is a radical selected from the group consisting of hydrogen, lower alkyl and monocyclic aryl and X is a radical selected from the group consisting of halogen, methyl, tetrafluoromethyl, cyano, dimethylamino, methoxy, methanesulfonyl and ethyl-mercapto, which comprises reacting a compound of the formula:

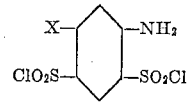

wherein X is a radical as defined above, with a compound selected from the group consisting of those having the following formulae:

RNH—CH$_2$OR'
RN(CH$_2$OR')$_2$
N(CH$_2$OR')$_3$
CH$_2$=N—R' wherein R represents a radical as defined above and R' represents a radical selected from the group consisting of lower alkyl and monocyclic aryl, thereafter treating the resulting intermediate with an acid selected from the group consisting of acetic acid and organic acids of similar ionic strength and recovering the resulting 7-sulfamyl-3,4-dihydro-1,2,4-benzothiadiazine-1,1-dioxide.

3. A process as claimed in claim 1 wherein the compound reacted with said acid dichloride is a mixture of mono-, di- and tri-alkoxy methylamines in which the alkoxy group has one to five carbon atoms.

4. A process as claimed in claim 1 wherein the compound produced is 6-chloro-7-sulfamyl-3,4-dihydro-1,2,4-benzothiadiazine-1,1-dioxide.

References Cited in the file of this patent
UNITED STATES PATENTS 2,809,194 Novello _____ Oct. 8, 1957
2,910,474 Novello _____ Oct. 27, 1959

FOREIGN PATENTS 1,108,700 Germany _____ June 15, 1961